Patented May 5, 1925.

1,536,064

UNITED STATES PATENT OFFICE.

RAYMOND C. BENNER, OF BAYSIDE, AND JOHN H. FINK, OF BROOKLYN, NEW YORK, ASSIGNORS TO THE PREST-O-LITE COMPANY, INC., A CORPORATION OF NEW YORK.

PROCESS OF MAKING STORAGE-BATTERY PLATES.

No Drawing.   Application filed June 6, 1922.   Serial No. 566,406.

*To all whom it may concern:*

Be it known that we, RAYMOND C. BENNER and JOHN H. FINK, citizens of the United States, residing at Bayside and Brooklyn, respectively, in the counties of Queens and Kings, respectively, and State of New York, have invented certain new and useful Improvements in Processes of Making Storage-Battery Plates, of which the following is a specification.

This invention relates to the manufacture of storage battery plates and particularly to an improved process of making preformed battery plates.

To facilitate the pasting of battery plates, the active materials heretofore generally used have been moistened more or less, as with sulfuric acid which, even in small quantities, will corrode metal parts of pasting appliances. The moistened active material quickly deteriorates so that some material is often wasted if a larger batch is made up than can be pasted into grids during working hours and, on the other hand, the time of employees is likely to be wasted if the batch is too small to last until quitting time. After pasting the plates with moistened active material, it is essential that they be placed into a pickling bath within a certain time. Such plates are also usually "formed" after pasting and pickling by immersing them in a forming bath. It is an object of this invention to eliminate the aforesaid wastes and the moistening and forming steps and thereby reduce the cost of production of battery plates.

In the process of the present invention the active material is made up and applied to the active material support in an air dry state. If the active material consists of a number of ingredients, all such ingredients are used in a dry state and the resulting dry mixture, without the addition of any moisture whatever, is forced at a comparatively heavy pressure of from 5 to 20 tons per square inch onto a suitable support such as the usual grid. Corrosion of the pasting machine is thus avoided. Since the active material is in a dry state-it will keep for reasonable periods, consequently it may be made up for a day's work and any excess may be carried over for use the next day. The dry ingredients used are desirably such that a "preformed" battery plate is obtained, but in its broader aspect the invention is not confined to that type of plate, and may also be applied to plates that are "formed."

The dry active material employed in making a positive "preformed" battery plate, for example, desirably consists of dry lead peroxid, dry litharge and a dry soluble porosity salt which is removed later to leave pores in the body of active material. The porosity salt employed may be a soluble alkaline sulfate,—for example, sodium sulfate or sodium acid sulfate, potassium sulfate or potassium acid sulfate, and ammonium sulfate,—the latter being not as desirable as the other salts mentioned because in reacting it often liberates ammonia gas so freely as to produce blisters on the surface of the active material. The proportions of the materials may vary, for example, the mixture of lead peroxid and litharge may consist of from 80 to 90% lead peroxid and 10 to 20% litharge, by volume, and the porosity salt used may be from 5 to 60% of the volume of the lead peroxid and litharge combined. The best proportions for a particular preformed positive plate prove to be about 85% lead peroxid, about 10% litharge and about 5% sodium acid sulfate, all by volume in an air dry state.

The dry mixture thus obtained, without the addition of any moisture, may be pressed onto the usual grid. For this purpose, a heavy pressure varying from about 5 to 20 tons per square inch may be employed. With such pressure no added moisture is required to effectively bond the dry particles together and to the grid. It appears that this intimate bond is obtained because the adsorbed films about the particles of active material are pressed out, which forces such particles to adhere closely together to produce a hard, firm mass that adheres to the grid. Moreover, the dry porosity salt becomes somewhat plastic under such pressure and forms a binding material to bond together the active material. Some of the porosity salt may even react under these pressures with the oxids of lead to form lead sulfate, which also acts as a binder.

After the dry mixture has been pressed onto the grids, the plates may be pickled in a solution of the porosity salt or other suitable agent, a saturated solution of such salt being desirable but not essential. These soluble porosity salts may remain in the plates in some cases or may be partially or entirely removed, as by leaching them out with a solvent such as water, so as to make the plates porous. The plates are then dried, whereupon they are ready to be assembled in a battery.

Substantially the foregoing procedure may also be applied in the manufacture of preformed negative plates, the active material used being dry sponge lead with or without the addition of a dry soluble porosity salt such as the salts mentioned or magnesium oxid. The volume of the dry sponge lead may vary from about 75% to about 100% and the volume of the dry porosity salt may vary from 0% to about 25%.

In the manufacture of "formed" plates, substantially the same procedure may be employed, supplemented by the usual forming operation while the porosity salts are being leached out or after they have been removed. In the positive "formed" plate the dry active material, for example, may consist of a dry mixture of litharge and red lead in various proportions, the volume of such dry lead oxid mixture comprising from about 40 to 90% and a dry porosity salt, as indicated, comprising from about 10 to 60% of the volume of the dry active material. Likewise, for the negative "formed" plate the volume of dry litharge may be from about 40 to 90% and the dry porosity salt may be from 10 to 60% of the volume of the active material mixture.

Since no moisture whatever is added to the active material mixture, it is possible to produce a denser active material on the grid. The dry mixture eliminates waste because it does not deteriorate rapidly, and also lends itself perfectly to mechanical methods of pressing active material into grids, and the plates are much harder and firmer, even though a large percentage of porosity salt is used, than those obtained by methods employing wet pastes in the construction of similar plates.

We claim:

1. Process of making storage battery plates that comprises pressing dry active material and a binder, at a heavy pressure and without addition of moisture, onto a suitable support.

2. Process of making storage battery plates that comprises forming an active mixture of dry ingredients including a binder comprising soluble material; pressing such mixture, in its dry state and without moistening, onto a suitable support at a heavy pressure, and removing soluble material therefrom.

3. Process of making a storage battery element that comprises forming a dry active material mixture comprising a dry soluble porosity salt; compressing such mixture, in its dry state and without dampening, onto an active material support at a heavy pressure; and leaching soluble material therefrom.

4. Process of making a storage battery element that comprises producing a dry mixture comprising dry litharge and a dry soluble porosity salt; compressing such mixture at a heavy pressure and without moistening onto a suitable support; and removing soluble material therefrom.

5. Process of making a positive storage battery plate that comprises mixing lead peroxide, litharge and soluble alkaline sulfate, all in a dry state; pressing such mixture, in its dry state and without moistening, onto a grid or support at a pressure of from 5 to 20 tons per square inch; and leaching soluble material therefrom.

In testimony whereof, we affix our signatures.

RAYMOND C. BENNER.
JOHN H. FINK.